United States Patent
Hovhannisyan et al.

(10) Patent No.: US 9,272,944 B2
(45) Date of Patent: Mar. 1, 2016

(54) GLASS-CERAMIC AS DIELECTRIC IN THE HIGH-FREQUENCY RANGE

(71) Applicant: SCHOTT AG, Mainz (DE)

(72) Inventors: Martun Hovhannisyan, Mainz (DE); Martin Letz, Mainz (DE); Gordon Kissl, Heidesheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/283,707

(22) Filed: May 21, 2014

(65) Prior Publication Data

US 2015/0018193 A1    Jan. 15, 2015

Related U.S. Application Data

(63) Continuation of application No. PCT/EP2012/073177, filed on Nov. 21, 2012.

(30) Foreign Application Priority Data

Nov. 24, 2011 (DE) .......................... 10 2011 119 798

(51) Int. Cl.
| | |
|---|---|
| C03C 10/00 | (2006.01) |
| C03B 19/02 | (2006.01) |
| C03C 3/062 | (2006.01) |
| C03C 4/16 | (2006.01) |
| H01B 3/08 | (2006.01) |

(Continued)

(52) U.S. Cl.
CPC ............... C03C 10/00 (2013.01); C03B 19/02 (2013.01); C03B 32/02 (2013.01); C03C 3/062 (2013.01); C03C 3/068 (2013.01); C03C 4/16 (2013.01); H01B 3/087 (2013.01); H01P 7/10 (2013.01); C03C 2204/00 (2013.01)

(58) Field of Classification Search
CPC ................................ C03C 10/00; C03B 32/02
See application file for complete search history.

(56) References Cited

U.S. PATENT DOCUMENTS

| | | | |
|---|---|---|---|
| 4,870,539 A | 9/1989 | Chance et al. | |
| 6,184,845 B1 | 2/2001 | Leisten et al. | |

(Continued)

FOREIGN PATENT DOCUMENTS

| | | |
|---|---|---|
| CN | 1623958 A | 6/2005 |
| DE | 102008011206 A1 | 9/2009 |

(Continued)

OTHER PUBLICATIONS

International Search Report dated May 20, 2014 for corresponding PCT/EP2012/073177, with English Translation.

(Continued)

*Primary Examiner* — Karl Group
(74) *Attorney, Agent, or Firm* — Ohlandt, Greeley, Ruggiero & Perle, LLP (57) ABSTRACT

A glass-ceramic is disclosed, this glass-ceramic includes at least the following constituents (in mol % on oxide basis): $SiO_2$ 1-30, $Al_2O_3$ 0-20, $B_2O_3$ 0-25, $TiO_2$ 10-70, $RE_2O_3$ 0-35, BaO 5-35, $SiO_2+Al_2O_3+B_2O_3<25$, where RE is lanthanum, another lanthanoid, or yttrium, and where Ti may be replaced in part, preferably up to 10%, by Zr, Hf, Y, Nb, V, Ta. A principal phase in the glass-ceramic is $BaTi_4O$.

20 Claims, 6 Drawing Sheets

(51) Int. Cl.
*C03B 32/02* (2006.01)
*H01P 7/10* (2006.01)
*C03C 3/068* (2006.01)

(56) References Cited

U.S. PATENT DOCUMENTS

| | | | |
|---|---|---|---|
| 6,458,734 | B1 | 10/2002 | Sugimoto et al. |
| 6,897,172 | B2 | 5/2005 | Furuse et al. |
| 7,365,036 | B2* | 4/2008 | Miyazaki et al. ............... 501/10 |
| 7,408,515 | B2 | 8/2008 | Leisten |
| 8,141,387 | B2* | 3/2012 | Letz et al. ...................... 65/33.2 |
| 8,772,188 | B2* | 7/2014 | Letz et al. ...................... 501/10 |
| 2002/0037804 | A1 | 3/2002 | Sugimoto et al. |
| 2004/0009863 | A1 | 1/2004 | Furuse et al. |
| 2005/0074590 | A1 | 4/2005 | Umemoto et al. |
| 2005/0268656 | A1 | 12/2005 | Raichel |
| 2007/0063902 | A1 | 3/2007 | Leisten |
| 2009/0215605 | A1* | 8/2009 | Letz et al. ......................... 501/5 |
| 2011/0028298 | A1* | 2/2011 | Hoppe et al. .................... 501/10 |
| 2013/0120193 | A1* | 5/2013 | Hoppe et al. ........... 343/700 MS |
| 2013/0237400 | A1* | 9/2013 | Letz et al. ...................... 501/32 |

FOREIGN PATENT DOCUMENTS

| | | |
|---|---|---|
| DE | 10 2010 012 524 A | 2/2012 |
| DE | 10 2010 032982 A1 | 2/2012 |
| GB | 795731 A | 5/1958 |
| JP | 2006124201 A | 5/2006 |
| JP | 2009-170555 A | 7/2009 |
| JP | 2011195440 A | 10/2011 |
| WO | 99/21803 A2 | 5/1999 |

OTHER PUBLICATIONS

English Translation of International Preliminary Report on Patentability dated Jun. 24, 2014 for corresponding PCT/EP2012/073177.
English Translation of Written Opinion of the International Searching Authority dated May 20, 2014 for corresponding PCT/EP2012/073177.
Sebastian, et al.,"Low loss dielectric materials for LTCC applications: a review", International Materials Review, Mar. 2008, vol. 53, No. 2, pp. 57-90, 36 pp.
Mirsaneh, et al., "Circularly Polarized Dielectric-Loaded Antennas: Current Technology and Future Challenges", Advanced Functional Materials, 2008, 18, pp. 1-8, 8 pp.

* cited by examiner

GLASS-CERAMIC AS DIELECTRIC IN THE HIGH-FREQUENCY RANGE

CROSS-REFERENCES TO RELATED APPLICATIONS

This application is a continuation of international patent application PCT/EP2012/073177, filed on Nov. 21, 2012 designating the U.S., which international patent application has been published in German language and claims priority from German patent application 10 2011 119 798.6, filed on Nov. 24, 2011. The entire contents of each of these priority applications being incorporated herein by reference.

BACKGROUND OF THE INVENTION

The invention relates to a glass-ceramic which can be employed as a dielectric in the high-frequency range (frequency>200 MHz), more particularly in the gigahertz range (frequency f>1 GHz).

For a series of applications in the high-frequency range, specific materials are needed which combine an extremely high relative permittivity $\in$ with an extremely low dielectric loss (tan δ). In order on the one hand to allow small antenna constructions and on the other to prevent close-range detuning by the body of a user (referred to as "body loading"), particular significance attaches to dielectric charging in the case of antennas, filters, and other devices. Required for this purpose are dielectrics which have a high relative permittivity, with $\in \geq 15$, and also a low dielectric loss (tan δ) of not more than $10^{-2}$, preferably lower, in the high-frequency range. Furthermore, the temperature dependence of the resonance frequency $\tau_f$ is to be extremely low. Lastly, a material of this kind is to be able to be processed extremely simply and inexpensively in order to allow near net shapes at favorable cost.

Known in the prior art are a series of ceramic materials which are processed by sintering operations. Glass-ceramics are likewise known—cf., e.g., a BiNbO$_4$ system, which is disclosed in Mirsaneh et al., "Circularly Loaded Dielectric-Loaded Antennas: Current Technology and Future Challenges", Adv. Funct. Materials 18, (2008), pp. 1-8, for application with dielectrically charged antennas for the gigahertz range. This material can be utilized for producing the three principally utilized forms of antennas: the circularly polarized DLA helix antenna (D-LQH antenna) and the square patch antenna, and also SMD antennas. For this purpose, a glass with a composition of 30 mol % Bi$_2$O$_3$, mol % Nb$_2$O$_5$, 30 mol % B$_2$O$_3$, and 10 mol % SiO$_2$ is first melted conventionally at 1250° C. for two hours.

This glass was poured into cylindrical molds, relaxed at 500 to 520° C., and cooled slowly to room temperature. This was then followed by crystallization at various temperatures between 600° C. and 1000° C. Specified as an optimum value for antenna applications in the case of heat treatment at 960° C. is a relative permittivity $\in$ of 15, with a quality factor Q·f$_0$ of 15 000 GHz and a temperature coefficient of the resonance frequency $\tau_f$ of −80 MK$^{-1}$. The crystalline phase characterized in this case was substantially orthorhombic BiNbO$_4$.

This system, using bismuth and niobium is expensive in terms of the raw materials.

In addition there are a series of sintered ceramic materials (cf. U.S. Pat. No. 6,184,845 B1, US 2007/063902 A1). Specified therein as dielectric material for the ceramic core of a dielectrically charged D-LQH antenna is a sintered ceramic material based on zirconium titanate and, respectively, based on zirconium tin titanate, with a relative permittivity of about 36. The material is said to be produced by extrusion or pressing and subsequent sintering.

Further sintered materials are specified in the review by M. T. Sebastian et al., "Low loss dielectric materials for LTCC applications", International Materials Reviews, Vol. 53, 2008, pp. 57-90. Although these materials are in some cases identified as "glass-ceramics", they are in fact sintered materials, since they are produced by the sintering of a mixture of vitreous and crystalline powders.

US 2002/0037804 A1 and US 2004/0009863 A1 further disclose dielectric ceramics which are said to form diverse crystal phases, such as, for instance, CaTiO$_3$, SrTiO$_3$, Ba Ti$_4$O$_9$, La$_2$Ti$_2$O$_7$, Nd$_2$Ti$_2$O, Ba$_2$Ti$_9$O$_{20}$, Mg$_2$TiO$_4$, Mg$_2$SiO$_4$, Zn$_2$TiO$_4$, etc., which are said to be responsible for high quality factors. These as well are sintered ceramics.

Dielectrics produced by sintering have a series of disadvantages: Every sintering operation is always associated with a certain shrinkage, leading to geometrical inaccuracies and corresponding final machining. Furthermore, every sintering operation produces a certain residual porosity, which is disadvantageous in the context of metalizing of the surface. The metal penetrates the pores and raises the dielectric loss of the dielectric.

Moreover, the production of sintered materials is fundamentally relatively inconvenient and expensive.

JP 2006124201 A, moreover, discloses a lead-free glass which is said to be used for producing a dielectric for a printed circuit, having a high dielectric constant and a low electrical loss. The glass contains (in mol %): 25 to 45 SiO$_2$, 5 to 25 BaO, 18 to 35 TiO$_2$, 1 to 10 Al$_2$O$_3$, 0 to 15 B$_2$O$_3$, 0 to 15 MgO+CaO+SrO, 0 to 7 WO+ZrO$_2$, with ZnO<1. It is said to crystallize on heat treatment as BaTi$_4$O$_9$.

JP 2011-195440 A, which corresponds to German patent application DE 10 2010 012 524.5, discloses, in addition, a glass-ceramic comprising the following constituents (in mol % on oxide basis):

SiO$_2$ 5-50
Al$_2$O$_3$ 0-20
B$_2$O$_3$ 0-25
BaO 0-25
TiO$_2$ 10-60
RE$_2$O$_3$ 5-35 where Ba may be replaced in part by Sr, Ca, Mg, where RE is lanthanum, another lanthanoid, or yttrium, and where Ti may be replaced in part by Zr, Hf, Y, Nb, V, Ta.

This glass-ceramic can be used to produce high-quality dielectrics, which are suitable in particular for high-frequency applications, such as antennas. It has nevertheless emerged as being disadvantageous here that this glass-ceramic as well is not optimized for the production of antennas, which necessitates subsequent metalizing of the surface. The residual porosity is still relatively high for this. Moreover, the raw materials costs of the known glass-ceramic with RE-Ti system and Nb—Ti systems are fairly high.

SUMMARY OF THE INVENTION

In view of this it is one object of the invention to disclose an improved material which can be employed as a dielectric for high-frequency applications.

It is a second object of the invention to disclose an improved dielectric material which having a high relative permittivity and a low dielectric loss.

It is a third object of the invention to disclose an improved dielectric material which is amenable to production and processing in an extremely simple and inexpensive way.

It is a forth object of the invention to disclose an improved dielectric material which suitable for the production of antennas.

According to one aspect of the invention these and other objects are solved by a glass-ceramic comprising at least the following constituents (in mol % on oxide basis):

$SiO_2$ 1-30
$Al_2O_3$ 0-20
$B_2O_3$ 0-25
$TiO_2$ 10-70
$RE_2O_3$ 0-<5
BaO 5-35
$SiO_2+Al_2O_3+B_2O_3<25$ wherein RE is selected from the group consisting of lanthanum, another lanthanoid, and yttrium, and wherein Ti may be replaced in part by at least one constituent selected from the group consisting of Zr, Hf, Nb, V, and Ta.

It has emerged that with a glass composition of this kind it is possible to melt homogeneous glasses which can be subsequently converted by a ceramizing treatment into a homogeneous glass-ceramic that features a high relative permittivity, a low dielectric loss, and a low temperature dependence of the resonance frequency. The material can be produced as a glass-ceramic in a simple and inexpensive way and permits near net shaping by melting processes, more particularly by pouring or, if appropriate, by pressing.

In the context of this specification, the term "glass-ceramic" refers to a material which, starting from a homogeneous glass produced by melting, is converted by a deliberate temperature treatment into a partially crystalline body, with a multiplicity of crystallites being embedded in substantially homogeneous distribution in a vitreous residual phase.

Where this specification specifies compositions by stating that certain constituents are present therein, or that they have certain constituents, these specifications shall always be understood to mean that any desired further constituents may be included therein (open composition).

In another embodiment of the invention, however, the stated compositions are also to be understood to mean that only the respectively indicated constituents are included (closed composition), apart from unavoidable impurities arising from the nature of glass manufacture. Depending on the purity of the raw materials used, such unavoidable impurities are restricted to a maximum of 1 wt %, preferably to 0.5 wt %, more preferably to 0.1 wt %, more preferably to 0.05 wt %, or even to 0.01 wt %.

Where this specification specifies compositions by stating that they consist of certain constituents, these compositions are always to be understood to mean that only the stated constituents are included therein (closed composition), albeit with the proviso that unavoidable impurities, arising from the nature of glass manufacture, may be present. Depending on the purity of the raw materials used, such unavoidable impurities are restricted to a maximum of 1 wt %, preferably to 0.5 wt %, more preferably to 0.1 wt %, more preferably to 0.05 wt %, or even to 0.01 wt %.

Where this specification specifies certain constituents in working examples by listing them, the statements are to be understood as closed compositions, albeit with the proviso that unavoidable impurities, arising from the nature of glass manufacture, may be present. Depending on the purity of the raw materials used, such unavoidable impurities are restricted to a maximum of 1 wt %, preferably to 0.5 wt %, more preferably to 0.1 wt %, more preferably to 0.05 wt %, or even to 0.01 wt %.

In an advantageous development of the invention, the glass-ceramic comprises the following constituents in mol % on oxide basis):

$SiO_2$ 2-20
$Al_2O_3$ 0-15
$B_2O_3$ 0-20
$TiO_2$ 25-55
$ZrO_2$ 1-15
$RE_2O_3$ 0-<5
BaO 10-30
$SiO_2+Al_2O_3+B_2O_3 \leq 20$, where RE is lanthanum, another lanthanoid or yttrium, and where Ti may be replaced in part, preferably up to 10% of the obligatory fraction, by Hf, Nb, V, Ta (solid solution).

In advantageous development of the invention, the glass-ceramic comprises the following constituents:

$SiO_2$ 2-20
$Al_2O_3$ 0-15
$B_2O_3$ 0-5
$TiO_2$ 40-65
$ZrO_2$ 5-12
$RE_2O_3$ 0-<5
BaO 10-30
$10 \leq SiO_2+Al_2O_3+B_2O_3 \leq 20$, where RE is lanthanum, another lanthanoid, or yttrium, and where Ti may be replaced in part, preferably up to 10% of the obligatory fraction, by Hf, Nb, V, Ta (solid solution).

According to a further-preferred embodiment of the invention, the $RE_2O_3$ content is 0.1 to 4.9 mol %, more preferably 0.5 to 4.5 mol %, more preferably 0.5 to 4 mol %, very preferably 1 to 3.5 mol %, where RE is preferably only lanthanum or another lanthanoid.

The glass-ceramic may further comprise refining agents in customary amounts, which may preferably involve 0.01 to 3 mol % of a refining agent selected preferably from the group formed by $Sb_2O_3$ and $As_2O_3$.

The glass-ceramic of the invention preferably has a dielectric loss (tan δ) of not more than $10^{-2}$, preferably of not more than $10^{-3}$ in the case of high-frequency applications (f>200 MHz).

Furthermore, the glass-ceramic preferably has a relative permittivity $\in$ of at least 15, preferably >18, preferably in the range from 20 to 80.

The glass-ceramic of the invention is further notable preferably for a temperature dependence of the resonance frequency $\tau_f$ of not more than 200 ppm/K, preferably not more than 50 ppm/K, more preferably of not more than 10 ppm/k.

In further-advantageous embodiment of the invention, the glass-ceramic of the invention comprises at least one solid solution phase based on RE, Ti, Si, O, and optionally Ba, where Ba may be replaced at least in part by Sr, Ca, Mg, where RE is a lanthanoid or yttrium, and where Ti may be replaced at least in part by Zr, Hf, Y, Nb, V, Ta (solid solution).

More particularly the glass-ceramic of the invention may comprise at least one solid solution phase selected from the group formed by $(BaO)_x(RE_2O_3)_y(SiO_2)_z(TiO_2)_u$, e.g. $RE_2Ti_2O_7$, $RE_2Ti_2SiO_9$, $BaTi_4O_9$ and $RE_4Ti_9O_{24}$, where RE is lanthanum, another lanthanoid, or yttrium, where up to 10% of Ba may be replaced by Sr, Ca, Mg, and where up to 10% of Ti may be replaced by Zr, Hf, Y, Nb, V, Ta (solid solution).

According to one preferred embodiment, the glass-ceramic comprises as predominant solid solution phase $BaTi_4O_9$ where Ba may be replaced in part by La, Ca, or Sr, and where Ti may be replaced in part by Zr, Hf, Y, Nb, V, Ta (solid solution).

A glass-ceramic of this kind can be produced with high quality and nevertheless very low raw materials costs, which are lower by a factor of approximately 10 to 100 than in the case of glass-ceramics with La—Ti and Nb—Ti systems.

According to one preferred embodiment, the glass-ceramic comprises as predominant solid solution phase $(BaO)_x(RE_2O_3)_y(Al_2O_3)_z(TiO_2)_u$, more particularly $Ba_4Al_2Ti_{10}O_{27}$, where Ba may be replaced in part by La, Ca, or Sr, and where Ti may be replaced in part by Zr, Hf, Y, Nb, V, Ta.

With the predominant solid solution phase $Ba_4Al_2Ti_{10}O_{27}$, particularly good results have been found, with high stability of the precursor glass prior to ceramizing, and with very high-quality glass-ceramics, in conjunction with very low raw materials costs.

The glass-ceramic of the invention may preferably have a crystalline fraction of least 30 vol %, preferably up to 95 vol %.

The average crystallite size is preferably 10 nm to 50 µm and is situated preferably in the range from 100 nm to 1 µm.

The glass-ceramic of the invention is suitable in particular as a dielectric for a dielectric resonator, an electronic frequency filter element, or an antenna element, in the high-frequency range (f>200 MHz).

Suitable more particularly is its use as a dielectric for a cylindrical antenna element or a patch antenna element.

A dielectric of the invention having a dielectric loss of not more than $10^{-2}$ in the high-frequency range can be produced with the following steps:
  melting and homogenizing a starting glass which comprises the following constituents (in mol % on oxide basis):
  $SiO_2$ 1-30
  $Al_2O_3$ 0-20
  $B_2O_3$ 0-25
  $TiO_2$ 10-70
  $RE_2O_3$ 0-<5
  BaO 5-35
  $SiO_2+Al_2O_3+B_2O_3<25$
where RE is lanthanum, another lanthanoid, or yttrium, and where Ti may be replaced in part, preferably up to 10% of the obligatory fraction, by Zr, Hf, Y, Nb, V, Ta;
  pouring the starting glass into a desired shape;
  cooling the starting glass to room temperature;
  ceramizing the starting glass by a heat treatment.

Preference is given in this context to the use of a starting glass which comprises at least the following constituents (in mol % on oxide basis):
  $SiO_2$ 2-20
  $Al_2O_3$ 0-15
  $B_2O_3$ 0-20
  $TiO_2$ 25-65
  $ZrO_2$ 1-15
  $RE_2O_3$ 0-<5
  BaO 10-30
  $SiO_2+Al_2O_3+B_2O_3\leq20$,
where RE is lanthanum, another lanthanoid, or yttrium, and where Ti may be replaced in part, preferably up to 10% of the obligatory fraction, by Hf, Nb, V, Ta.

Used with further preference in this context is a starting glass which comprises at least the following constituents (in mol % on oxide basis):
  $SiO_2$ 2-20
  $Al_2O_3$ 0-15
  $B_2O_3$ 0-5
  $TiO_2$ 40-65
  $ZrO_2$ 5-12
  $RE_2O_3$ 0-<5
  BaO 10-30
  $10\leq SiO_2+Al_2O_3+B_2O_3\leq20$,
where RE is lanthanum, another lanthanoid, or yttrium, and where Ti may be replaced in part, preferably up to 10% of the obligatory fraction, by Hf, Nb, V, Ta.

The starting glass is brought preferably by a melting process into a near net shape.

BRIEF DESCRIPTION OF THE DRAWINGS

Further features and advantages of the invention will become apparent from the description hereinafter of preferred working examples, with reference to the drawing. In the drawing.

EXAMPLES

Assembled in table 1 are various glass compositions for a starting glass in the Ba—Ti—Zr—Si—O system, in some cases with additions of Al, B, RE.

The various glass samples of examples 1 to 7 are first of all conventionally melted and homogenized using customary starting materials; platinum crucibles, Pt/Ir crucibles, Pt/Rh crucibles, fused silica crucibles, or aluminum oxide crucibles may be used. The samples are melted first at 1350° C. for 2 hours, then refined at 1400° C. for 30 minutes, stirred and homogenized for 20 minutes with a platinum stirrer, allowed to stand for 10 minutes, and then poured off into suitable molds made of steed, graphite, aluminum oxide, or fused silica, for instance, and hence brought into a near net shape.

After cooling to room temperature, the glass is subjected to a ceramizing step.

A typical ceramizing cycle by means of an infrared furnace is as follows:
  heating at 300 K/min to 1050° C.;
  holding at 1050° C. for 7 seconds;
  heating to 1203° C. at a heating rate of 50 K/min;
  holding at 1200° C. for 15 minutes;
  cooling to about 500° C. by switching off the furnace, with a cooling rate of about 50 K/min;
  removal of the sample from the furnace when a temperature of about 500° C. is reached.

An alternative option is to carry out a ceramizing cycle in a conventional oven, by heat treatment at 925° C. over 0.5 to 20 hours.

Where necessary, the moldings, after having been poured, may be further finished by a grinding or polishing treatment or, in the case of the production of cylindrical moldings, may be subjected to centerless cylindrical grinding.

Figure 1:
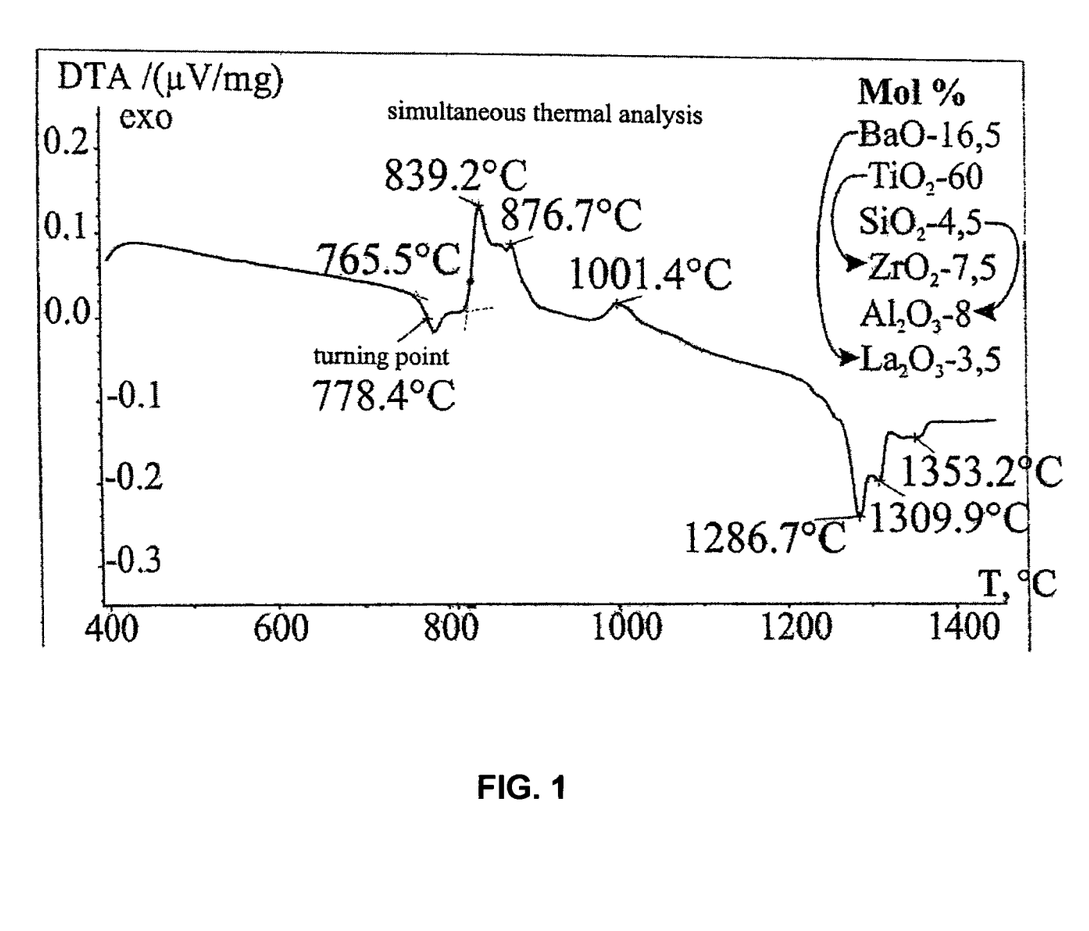
FIG. 1 shows the result of a DTA of a first working example.

FIG. 1 shows a differential thermal analysis (DTA) of example 5 as per table 1. The peaks show the formation of different crystal phases, with the predominant crystal phase being $BaTi_4O_9$.

Figure 2:
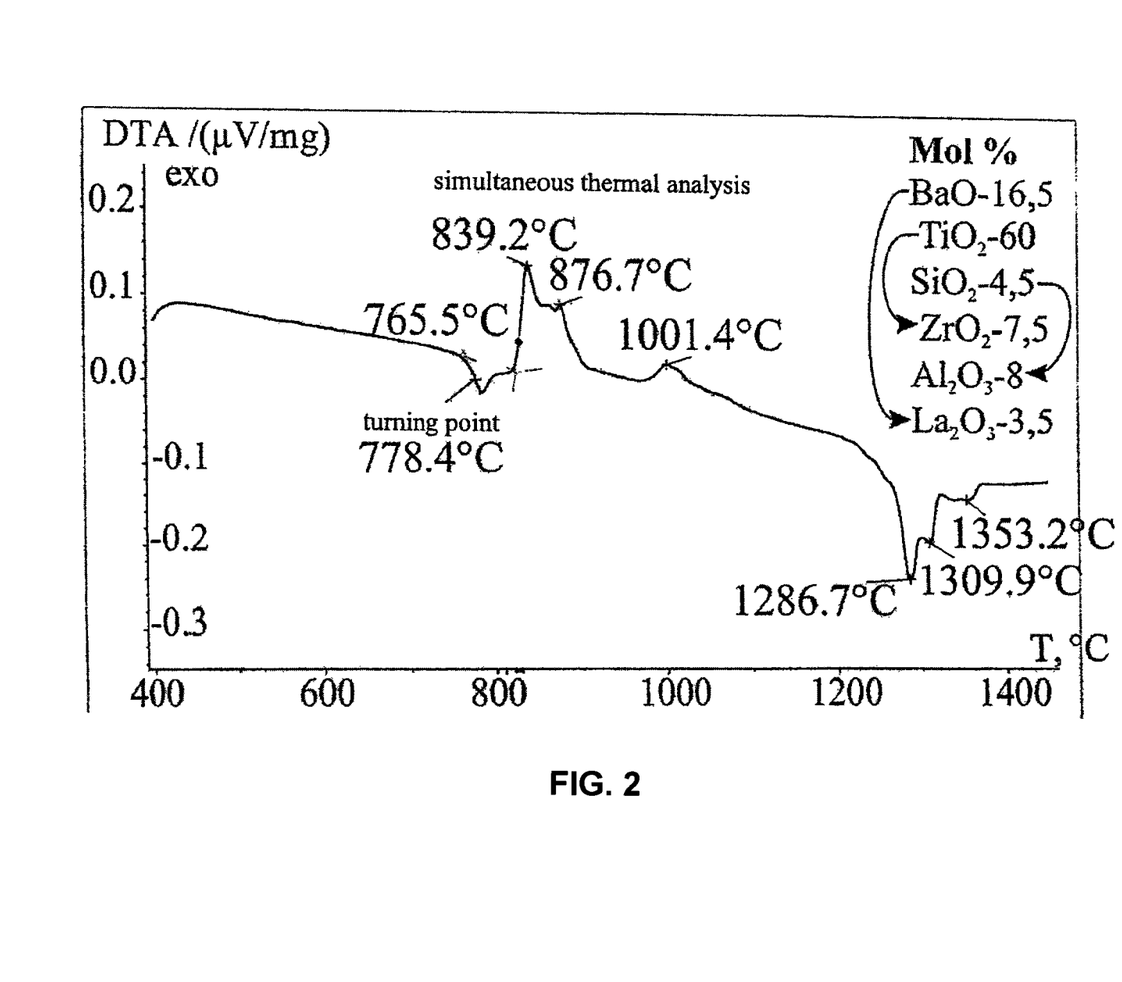
FIG. 2 shows the result of a DTA of a second working example.

FIG. 2 shows a DTA of example 6 as per table 1. The peaks show the formation of crystal phases, with the peak at the lowest temperature, at 841° C. indicating the formation of $BaTi_4O_9$.

In the case of the glass compositions in the $BaO$—$SiO_2$—$TiO_2$ system as per table 1, the relevant glasses lie outside of the range in which stable glasses are likely according to the $BaO$—$SiO_2$—$TiO_2$ state diagram. Only by Ti→Zr, Ba→La, and Si→Al, B replacement, in other words by the use of solid solutions, in other words disorder in the crystal phase as well at the Ba and Ti site, was it possible to extend the glass formation range accordingly (stable starting glasses are of course a basic prerequisite for reproducible glass-ceramics having homogeneous properties).

The volume fraction of the crystalline phase in the case of examples 1 to 7 according to table 1 lies in the order of magnitude of about 30 to 60 vol %.

The relative permittivities $\epsilon_r$ of samples 1 to 7 were measured, and were all greater than 15 and situated in the range from 20 to 50.

The samples are further notable for a low dielectric loss and a high quality.

Quality Q is the reciprocal of the dielectric loss (tan δ):

$Q=1/\tan(\delta)$.

The quality is measured by the Hakki-Coleman resonance method. In this case, the quality factor is determined as a product of quality Q and measuring frequency $f_0$. The measurements were conducted at about 7 to 8 GHz.

Apart from example 1, all examples had a quality factor $Q \cdot f_0$ in the range of more than 1000 GHz. For example 5, a quality Q of 418 was measured at 7.547 GHz, in other words a quality factor of 3155 GHz.

The absolute value of the temperature coefficient of the resonance frequency is very low for all of the samples measured.

In the case of applications as a dielectric for antennas that are suitable in particular as mobile GPS antennas for cell phones, the frequency range is located above 200 MHz, more particularly in the range from about 800 MHz to 70 GHz. The dielectric charging of the antenna reduces the sensitivity of the antenna to detuning by the user.

Figure 4:
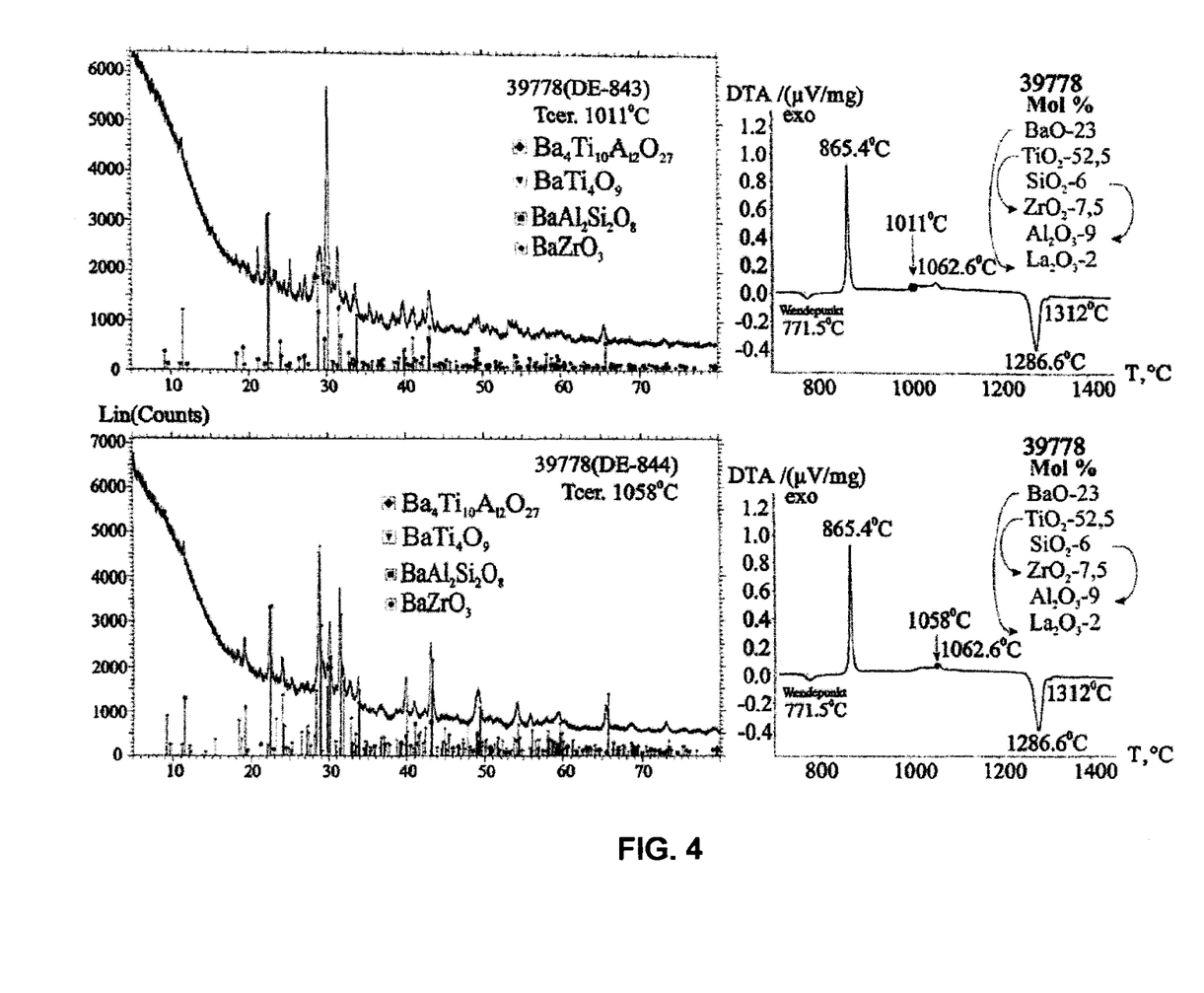
FIG. 4 shows an x-ray diffractometer analysis (XRD) and a DTA analysis of two samples comprising as predominant solid solution phase $Ba_4Al_2Ti_{10}O_{27}$.

Summarized in Table 2 are the compositions of a series of further inventive glasses as precursor glasses. The associated ceramizing data are given in tables 2a and 2b. The melt 39976 corresponds in its composition to the melt 39998. It is, however, a melt in a liter volume, with which ceramizing tests were run additionally, in accordance with table 2b, at different temperatures. For the glass-ceramics in question, the solid solution phase formed primarily was $Ba_4Al_2Ti_{10}O_{27}$; cf. the associated FIG. 4 with XRD (x-ray diffractometer) and DTA of a number of samples from table 2a. It is found that ceramizing in a conventional oven at 1000° C. to 1010° C. over 6 hours is optimal, with similar results at 1058° C. over 15 minutes.

Tables 3 and 3a compile further melts and glass-ceramics produced from them, with the associated properties.

In these cases, the melts, consisting of $BaO$, $TiO_2$, $ZrO_2$, $SiO_2$, $Al_2O_3$, $La_2O_3$, were admixed with small additions, of between 0.0125 mol % and 0.075 mol %, of ZnO and $B_2O_3$ in a eutectic composition. As is apparent from table 3a, even very small additions of 0.0125 mol % lead to high quality factors and very low dielectric losses.

Figure 5:
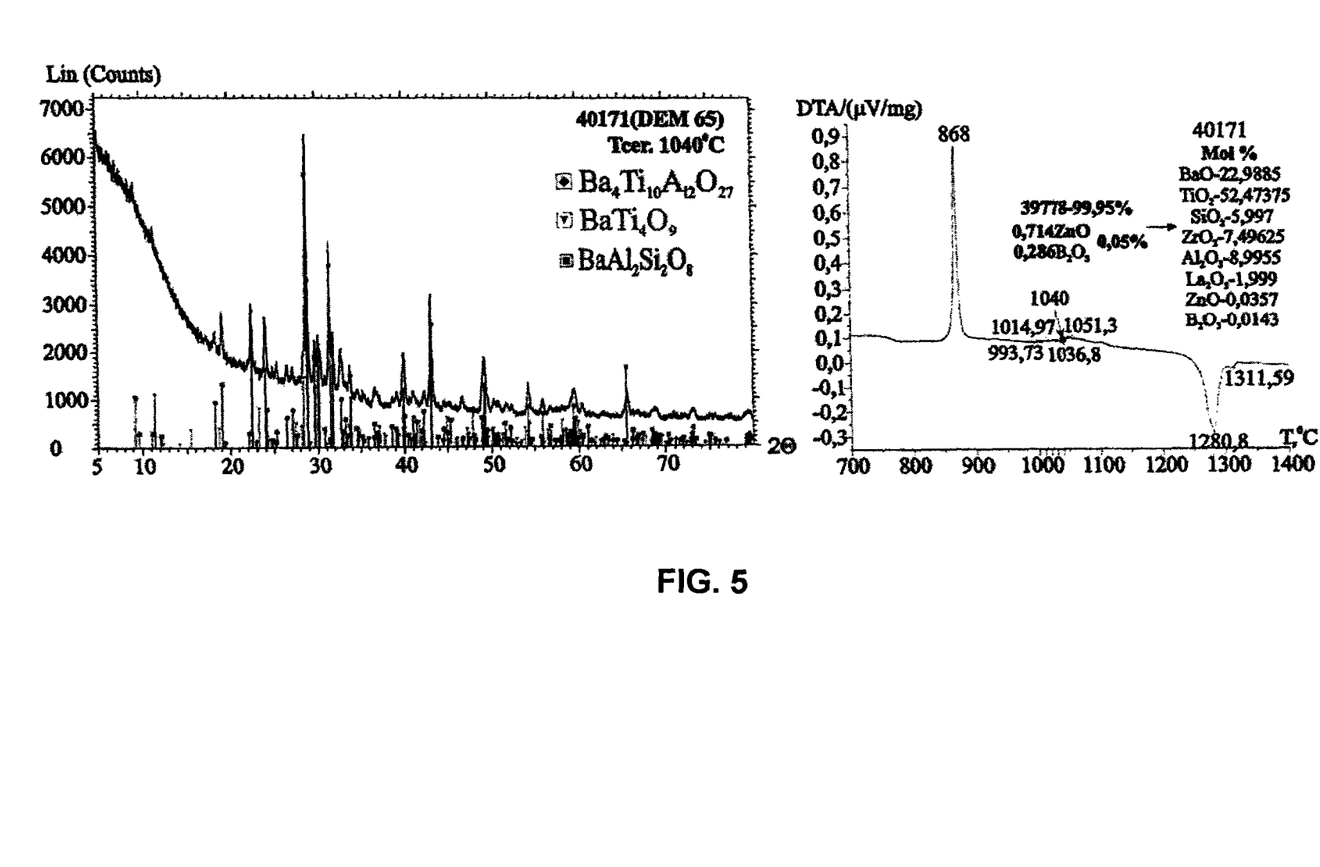
FIG. 5 shows an x-ray diffractometer analysis (XRD) and a DTA analysis of a further sample with the predominant solid solution phase $Ba_4Al_2Ti_{10}O_{27}$ with small additions of ZnO and $B_2O_3$.
Figure 6:
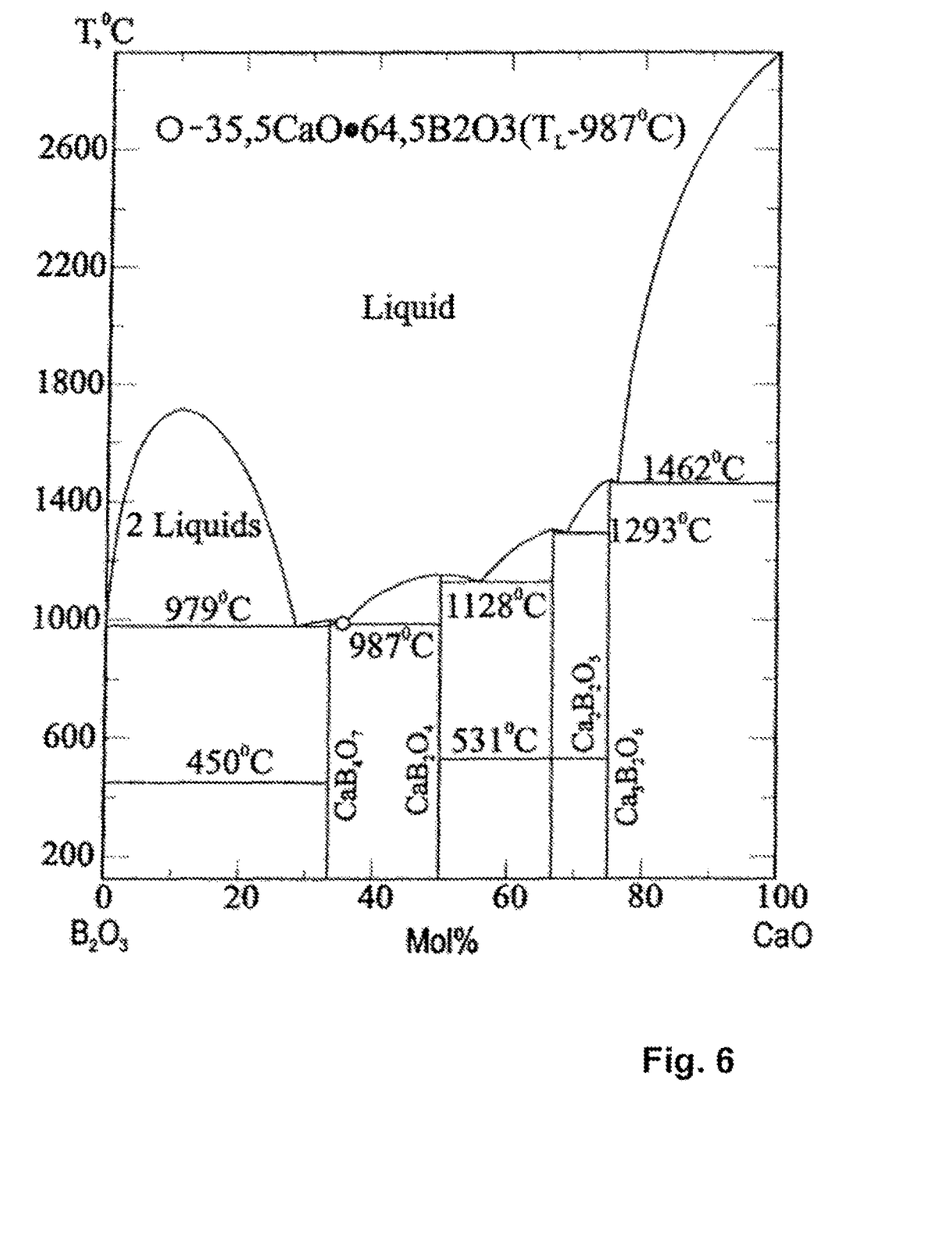
FIG. 6 shows the state diagram of $B_2O_3$—CaO, which was added as a flux agent in eutectic composition in the case of the sample according to FIG. 5.

Further precursor glasses, melted with small additions (0.0125-0.075 mol %) of CaO and $B_2O_3$ in the very low-melting eutectic composition of 35.5 mol % CaO and 64.5 mol % $B_2O_3$ (cf. FIG. 6), are summarized in table 4. The associated ceramizing conditions for the glass-ceramics produced from them, and the properties measured, are summarized in table 4a. FIG. 5 shows an XRD and a DTA of the sample 40171 (DEM-65). The peak in the DTA at about 1280° C. indicates the formation of the solid solution phase $Ba_4Al_2Ti_{10}O_{27}$. As is evident from the XRD, the glass-ceramic comprises predominantly the solid solution phase $Ba_4Al_2Ti_{10}O_{27}$.

The precursor glasses in question are stable and can be melted at low temperature in accordance with the procedure described above. The glass-ceramics produced therefrom are notable for particularly good properties. The raw materials for producing them are particularly favorable, and so they are suitable for mass production.

Figure 3:
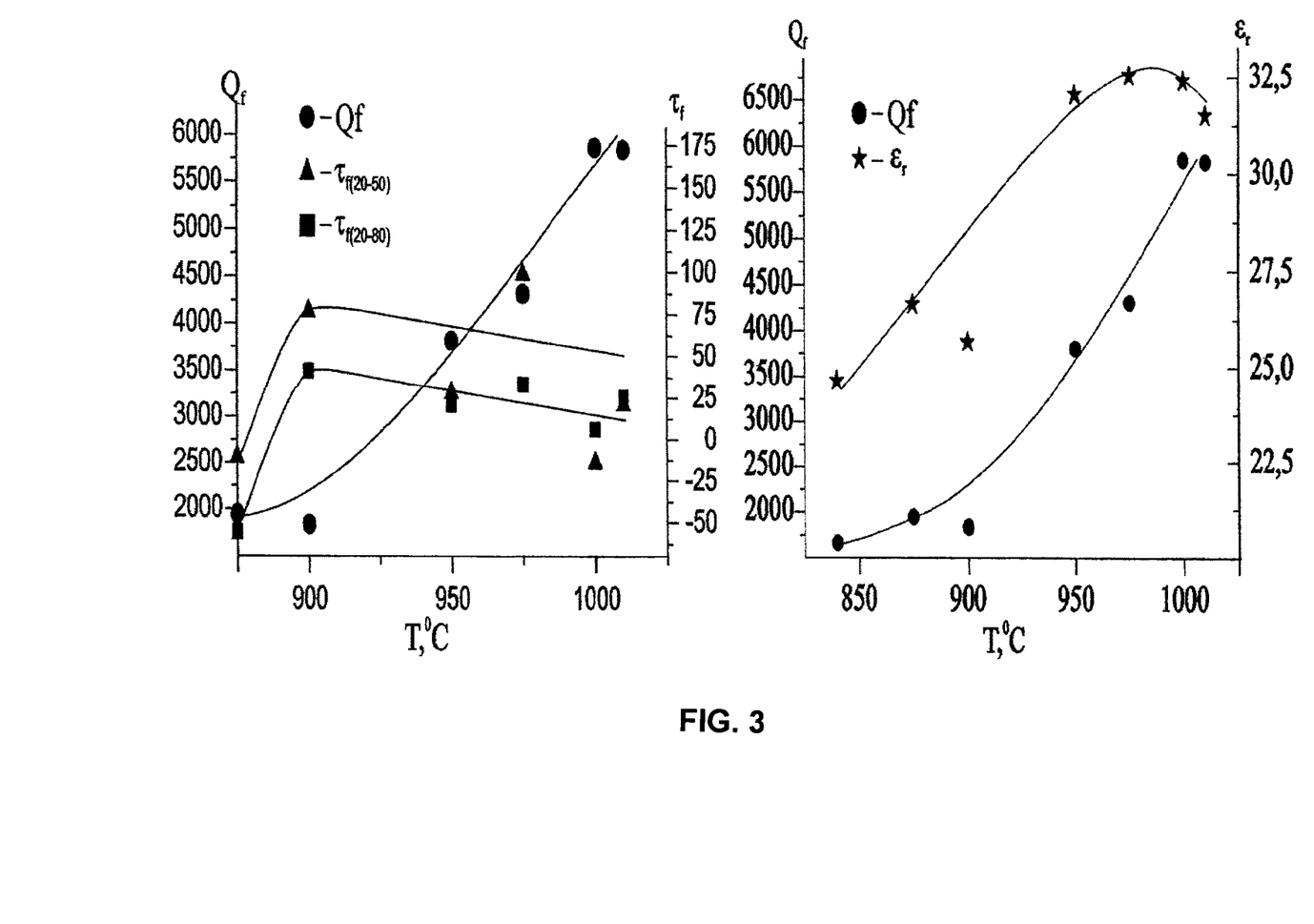
FIG. 3 shows a compilation of the key properties of an experimental series of inventive glass-ceramics, comprising $Ba_4Al_2Ti_{10}O_{27}$ as predominant solid solution phase, as a function of the ceramizing temperature.

A compilation of the properties of the various glass-ceramics of tables 2 to 4, in which the predominant solid solution phase formed is $Ba_4Al_2Ti_{10}O_{27}$, is contained in FIG. 3. The quality factors are situated in the range from about 1000 GHz to about 6000 GHz, with temperature dependencies $|\tau_f|$ obtainable, depending on ceramizing temperature, that are lower than 100 ppm/K and can be brought to close to zero by means of optimized ceramizing conditions (ceramizing time 6 h). The relative permittivities $\epsilon_r$ are in the range from about 25 to 33.

TABLE 1

| No. | Composition/mol % | | | | | | | Properties | | | | | | |
| --- | --- | --- | --- | --- | --- | --- | --- | --- | --- | --- | --- | --- | --- | --- |
| | BaO | $TiO_2$ | $ZrO_2$ | $SiO_2$ | $Al_2O_3$ | $B_2O_3$ | $La_2O_3$ | f/GHz | Q | Qf/GHz | d/mm | h/mm | $\epsilon_r$ | tan δ |
| 1 | 25 | 51 | 9 | 15 | | | | 8.212 | 93 | 764 | 9.86 | 5.11 | 25.52 | 0.0106 |
| 2 | 25 | 52.5 | 7.5 | 6 | 9 | | | 9.1257 | 213 | 1944 | 10.05 | 4.69 | 22.5 | 0.0045 |
| 3 | 23 | 52.5 | 7.5 | 6 | 9 | | 2 | 8.8686 | 182 | 1614 | 10.05 | 4.71 | 23.75 | 0.0053 |
| 4 | 25 | 52.5 | 7.5 | 5.5 | 7.5 | 2 | | 9.178 | 193 | 1771 | 10.03 | 4.63 | 22.64 | 0.005 |
| 5 | 16.5 | 60 | 7.5 | 4.5 | 8 | | 3.5 | 7.547 | 418 | 3155 | 10.04 | 4.82 | 31.9 | 0.0023 |
| 6 | 20.5 | 60 | 7.5 | 4 | 6 | | 2 | 7.952 | 223 | 1773 | 10.04 | 4.71 | 29.55 | 0.0043 |
| 7 | 20.5 | 57.5 | 7.5 | 6.25 | 6.25 | | 2 | 8.105 | 197 | 1597 | 10.04 | 4.72 | 28.35 | 0.0049 |

| mol % | | wt % | |
| --- | --- | --- | --- |
| 39778 | | | |
| BaO | 23 | BaO | 33.6359 |
| $TiO_2$ | 52.5 | $TiO_2$ | 40.0488 |
| $SiO_2$ | 6 | $ZrO_2$ | 7.0515 |
| $ZrO_2$ | 7.5 | $SiO_2$ | 4.2963 |
| $Al_2O_3$ | 9 | $Al_2O_3$ | 8.7523 |
| $La_2O_3$ | 2 | $La_2O_3$ | 6.2152 |
| | | | 100 |

-continued

|  | mol % |  | wt % |
|---|---|---|---|
| 39779 | | | |
| BaO | 22.5 | BaO | 32.6363 |
| TiO$_2$ | 52.5 | TiO$_2$ | 39.722 |
| SiO$_2$ | 6 | ZrO$_2$ | 6.994 |
| ZrO$_2$ | 7.5 | SiO$_2$ | 4.2613 |
| Al$_2$O$_3$ | 9 | Al$_2$O$_3$ | 8.6808 |
| La$_2$O$_3$ | 2.5 | La$_2$O$_3$ | 7.7056 |
| | | | 100 |
| 39780 | | | |
| BaO | 23 | BaO | 33.6617 |
| TiO$_2$ | 52.5 | TiO$_2$ | 40.0795 |
| SiO$_2$ | 5.85 | ZrO$_2$ | 6.8805 |
| ZrO$_2$ | 7.5 | SiO$_2$ | 4.2996 |

-continued

|  | mol % |  | wt % |
|---|---|---|---|
| Al$_2$O$_3$ | 9 | Al$_2$O$_3$ | 8.759 |
| La$_2$O$_3$ | 2 | La$_2$O$_3$ | 6.22 |
| B$_2$O$_3$ | 0.15 | B$_2$O$_3$ | 0.0997 |
| | | | 100 |
| 39781 | | | |
| BaO | 23.5 | BaO | 34.6522 |
| TiO$_2$ | 52.5 | TiO$_2$ | 40.3809 |
| SiO$_2$ | 6 | ZrO$_2$ | 7.11 |
| ZrO$_2$ | 7.5 | SiO$_2$ | 4.3319 |
| Al$_2$O$_3$ | 9 | Al$_2$O$_3$ | 8.8249 |
| La$_2$O$_3$ | 1.5 | La$_2$O$_3$ | 4.7001 |
| | | | 100 |

TABLE 2a

| Melt No. | Ceram. No. | Tcer./ °C. | Freq./ GHz | Q | Qf/ GHz | d/ mm | h/ mm | $\epsilon_r$ | tan δ |
|---|---|---|---|---|---|---|---|---|---|
| 39778 | Glass | | 10.08 | 200 | 2016 | 9.91 | 4.41 | 20.1 | 0.0048 |
| 39778 | 26 | 859-6 h | 10.32 | 160 | 1651.2 | 10.14 | 3.64 | 24.1 | 0.0059 |
| 39778 | 843 | 1011-6 h | 7.61 | 297 | 2260.17 | 9.99 | 4.81 | 31.6 | 0.0032 |
| 39778 | 844 | 1058-6 h | 7.447 | 689 | 5130.98 | 10 | 4.82 | 32.9 | 0.0013 |
| 39779 | Glass | | 10.05 | 189 | 1899.45 | 9.89 | 4.42 | 20.2 | 0.005 |
| 39779 | 27 | 865-6 h | 9.859 | 209 | 2060.53 | 10.24 | 3.64 | 26.9 | 0.0049 |
| 39779 | 30 | 1006-6 h | 7.367 | 1151 | 8479.42 | 10.17 | 4.81 | 33.28 | |
| 39779 | 845 | 1006-15 min | 7.553 | 305 | 2303.67 | 9.99 | 4.82 | 32 | 0.0032 |
| 39779 | 846 | 1053-15 min | 7.23 | 509 | 3680.07 | 9.95 | 4.82 | 34.1 | 0.0019 |
| 39780 | Glass | | 10.11 | 202 | 2042.22 | 9.89 | 4.42 | 19.95 | 0.0047 |
| 39780 | 847 | 985 | 8.186 | 161 | 1317.946 | 10 | 4.83 | 27.1 | 0.0061 |
| 39780 | 891 | 1031 | 7.549 | 405 | 3057.345 | 10.28 | 4.68 | 32.9 | 0.0023 |
| 39780 | 31 | 1033 | 7.406 | 857 | 6346.94 | 10.19 | 4.82 | 32.8 | |
| 39781 | Glass | | 10.15 | 191 | 1938.65 | 9.9 | 4.42 | 19.75 | 0.005 |

TABLE 2B

| Melt No. | Ceram. No. | Tcryst./° C. | Freq./ GHz | Q | Qf/GHz | d/mm | h/mm | $\epsilon_r$ | tan δ |
|---|---|---|---|---|---|---|---|---|---|
| 39976 | Glass | | 9.207 | 199 | 1832.193 | 10.36 | 5.03 | 19.82 | 0.0048 |
| 39976 | DEM-40 | 840-6 h | 8.62 | 193 | 1663.66 | 10.4 | 4.68 | 24.6 | 0.005 |
| 39976 | DEM-68 | 875-6 h | 8.048 | 242 | 1947.616 | 10.36 | 4.94 | 26.6 | 0.004 |
| 39976 | DEM-69 | 900-6 h | 8.086 | 227 | 1835.552 | 10.36 | 5.05 | 25.62 | 0.0043 |
| 39976 | DEM-50 | 950-6 h | 7.354 | 520 | 3824.08 | 10.25 | 4.95 | 32 | 0.0018 |
| 39976 | DEM-51 | 975-6 h | 7.289 | 595 | 4336.955 | 10.25 | 4.96 | 32.52 | 0.0016 |
| 39976 | DEM-52 | 1000-6 h | 7.305 | 807 | 5895.135 | 10.27 | 4.95 | 32.4 | 0.0011 |
| 39976 | DEM-41 | 1010-6 h | 7.307 | 804 | 5874.82 | 10.31 | 5.05 | 31.5 | 0.0011 |
| 39976 | DE-893 | 1058-15 min | 7.781 | 525 | 4084.5 | 10.33 | 4.68 | 30.4 | 0.0018 |
| 39778 | DEM-26 | 859-6 h | 10.32 | 160 | 1651.2 | 10.14 | 3.64 | 24.1 | 0.0059 |
| 39778 | DE-843 | 1011-15 min | 7.61 | 297 | 2260.17 | 9.99 | 4.81 | 31.6 | 0.0032 |
| 39778 | DE-844 | 1058-15 min | 7.447 | 689 | 5130.98 | 10 | 4.82 | 32.9 | 0.0013 |

TABLE 3

|  |  |  |  | mol % |  | wt % |
|---|---|---|---|---|---|---|
| 40169 mol % | | | | | | |
| BaO | 23 | 98.9875 | 22.99713 BaO | 22.99713 BaO | 33.33165 |
| TiO$_2$ | 52.5 | | 52.49344 TiO$_2$ | 52.49344 TiO$_2$ | 39.68647 |
| ZrO$_2$ | 7.5 | | 7.499063 ZrO$_2$ | 7.499063 ZrO$_2$ | 8.734625 |
| SiO$_2$ | 6 | | 5.99925 SiO$_2$ | 5.99925 SiO$_2$ | 3.405951 |
| Al$_2$O$_3$ | 9 | | 8.998875 Al$_2$O$_3$ | 8.998875 Al$_2$O$_3$ | 8.673096 |
| La$_2$O$_3$ | 2 | | 1.99975 La$_2$O$_3$ | 1.99975 La$_2$O$_3$ | 6.15899 |
| | | | | ZnO 0.008925 | ZnO 0.006866 |
| | | | | B$_2$O$_3$ 0.003575 | B$_2$O$_3$ 0.002353 |
| ZnO | 71.4 | 0.0125 | 0.008925 | | |
| B$_2$O$_3$ | 28.6 | | 0.003575 | | 100 |

TABLE 3-continued

|  |  |  | mol % |  |  |  | wt % |
|---|---|---|---|---|---|---|---|
| 40170 | | | | | | | |
| BaO | 23 | 99.975 | 22.99425 | BaO | 22.99425 | BaO | 33.32857 |
| TiO$_2$ | 52.5 | | 52.48688 | TiO$_2$ | 52.48688 | TiO$_2$ | 39.68281 |
| ZrO$_2$ | 7.5 | | 7.498125 | ZrO$_2$ | 7.498125 | ZrO$_2$ | 8.73382 |
| SiO$_2$ | 6 | | 5.9985 | SiO$_2$ | 5.9985 | SiO$_2$ | 3.405637 |
| Al$_2$O$_3$ | 9 | | 8.99775 | Al$_2$O$_3$ | 8.99775 | Al$_2$O$_3$ | 8.672296 |
| La$_2$O$_3$ | 2 | | 1.9995 | La$_2$O$_3$ | 1.9995 | La$_2$O$_3$ | 6.158423 |
| | | | | | | ZnO | 0.01785 | ZnO | 0.013733 |
| | | | | | | B$_2$O$_3$ | 0.00715 | B$_2$O$_3$ | 0.004706 |
| ZnO | 71.4 | 0.025 | 0.01785 | | | | 100 |
| B$_2$O$_3$ | 28.6 | | 0.00715 | | | | |
| 40171 | | | | | | | |
| BaO | 23 | 99.95 | 22.9885 | BaO | 22.9885 | BaO | 33.32243 |
| TiO$_2$ | 52.5 | | 52.47375 | TiO$_2$ | 52.47375 | TiO$_2$ | 39.67549 |
| ZrO$_2$ | 7.5 | | 7.49625 | ZrO$_2$ | 7.49625 | ZrO$_2$ | 8.732209 |
| SiO$_2$ | 6 | | 5.997 | SiO$_2$ | 5.997 | SiO$_2$ | 3.405009 |
| Al$_2$O$_3$ | 9 | | 8.9955 | Al$_2$O$_3$ | 8.9955 | Al$_2$O$_3$ | 8.670696 |
| La$_2$O$_3$ | 2 | | 1.999 | La$_2$O$_3$ | 1.999 | La$_2$O$_3$ | 6.157287 |
| | | | | | | ZnO | 0.0357 | ZnO | 0.027469 |
| | | | | | | B$_2$O$_3$ | 0.0143 | B$_2$O$_3$ | 0.009412 |
| ZnO | 71.4 | 0.05 | 0.0357 | | | | 100 |
| B$_2$O$_3$ | 28.6 | | 0.0143 | | | | |
| 40172 | | | | | | | |
| BaO | 23 | 99.925 | 22.98275 | BaO | 22.98275 | BaO | 33.31628 |
| TiO$_2$ | 52.5 | | 52.46063 | TiO$_2$ | 52.46063 | TiO$_2$ | 39.66817 |
| ZrO$_2$ | 7.5 | | 7.494375 | ZrO$_2$ | 7.494375 | ZrO$_2$ | 8.730597 |
| SiO$_2$ | 6 | | 5.9955 | SiO$_2$ | 5.9955 | SiO$_2$ | 3.40438 |
| Al$_2$O$_3$ | 9 | | 8.99325 | Al$_2$O$_3$ | 8.99325 | Al$_2$O$_3$ | 8.669096 |
| La$_2$O$_3$ | 2 | | 1.9985 | La$_2$O$_3$ | 1.9985 | La$_2$O$_3$ | 6.156151 |
| | | | | | | ZnO | 0.05355 | ZnO | 0.041206 |
| | | | | | | B$_2$O$_3$ | 0.02145 | B$_2$O$_3$ | 0.014119 |
| ZnO | 71.4 | 0.075 | 0.05355 | | | | 100 |
| B$_2$O$_3$ | 28.6 | | 0.02145 | | | | |

TABLE 3A

| Melt No. | Ceram. No. | Tcryst./° C. | Freq./GHz | Q | Qf/GHz | d/mm | h/mm | $\epsilon_r$ | tan δ |
|---|---|---|---|---|---|---|---|---|---|
| | (39778 − 99.925) · ((0.714ZnO · 0.286B2O3) − 0.075) | | | | | | | | |
| 40172 | DEM-64 | 1040 | 7.4102 | 1238.17 | 9175.087 | 10.27 | 4.73 | 33.27 | 6.88*10$^{-4}$ |
| | (39778 − 99.95) · ((0.714ZnO · 0.286B2O3) − 0.05) | | | | | | | | |
| 40171 | DEM-65 | 1040 | 7.4239 | 1196.04 | 8879.281 | 10.26 | 4.73 | 33.18 | 7.17*10$^{-4}$ |
| | (39778 − 99.975) · (0.714ZnO · 0.286B2O3) − 0.025) | | | | | | | | |
| 40170 | DEM-66 | 1041 | 7.3872 | 1206.91 | 8915.686 | 10.24 | 4.72 | 33.64 | 7.15*10$^{-4}$ |
| | (39778 − 99.9875) · (0.714ZnO · 0.286B2O3) − 0.0125) | | | | | | | | |
| 40169 | DEM-67 | 1041 | 7.3839 | 1233.6 | 9108.779 | 10.33 | 4.73 | 33.36 | 6.78*10$^{-4}$ |

Ceramizing time: 6 h

TABLE 4

|  |  | mol % | mol % |  |  |  | wt % |
|---|---|---|---|---|---|---|---|
| 40173 | | | | | | | |
| BaO | 23 | 99.9875 | 22.99713 | BaO | 22.99713 | BaO | 33.33217 |
| TiO2 | 52.5 | | 52.49344 | TiO2 | 52.49344 | TiO2 | 39.68709 |
| ZrO2 | 7.5 | | 7.499063 | ZrO2 | 7.499063 | ZrO2 | 8.734761 |
| SiO2 | 6 | | 5.99925 | SiO2 | 5.99925 | SiO2 | 3.406004 |
| Al2O3 | 9 | | 8.998875 | Al2O3 | 8.998875 | Al2O3 | 8.673231 |
| La2O3 | 2 | | 1.99975 | La2O3 | 1.99975 | La2O3 | 6.159087 |
| | | | | B2O3 | 0.008063 | B2O3 | 0.005306 |
| | | | | CaO | 0.004438 | CaO | 0.002352 |
| CaO | 35.5 | 0.0125 | 0.004438 | | | | 100 |
| B2O3 | 64.5 | | 0.008063 | | | | |

TABLE 4-continued

|  |  | mol % | mol % |  |  |  |  |  | wt % |
|---|---|---|---|---|---|---|---|---|---|
| 40174 |  |  |  |  |  |  |  |  |  |
| BaO | 23 | 99.975 | 22.99425 | BaO | 22.99425 | BaO |  |  | 33.32961 |
| TiO2 | 52.5 |  | 52.48688 | TiO2 | 52.48688 | TiO2 |  |  | 39.68405 |
| ZrO2 | 7.5 |  | 7.498125 | ZrO2 | 7.498125 | ZrO2 |  |  | 8.734092 |
| SiO2 | 6 |  | 5.9985 | SiO2 | 5.9985 | SiO2 |  |  | 3.405743 |
| Al2O3 | 9 |  | 8.99775 | Al2O3 | 8.99775 | Al2O3 |  |  | 8.672567 |
| La2O3 | 2 |  | 1.9995 | La2O3 | 1.9995 | La2O3 |  |  | 6.158615 |
|  |  |  |  |  | 0.016125 | B2O3 |  |  | 0.010613 |
|  |  |  |  |  | 0.008875 | CaO |  |  | 0.004705 |
| CaO | 35.5 | 0.025 | 0.008875 |  |  |  |  |  | 100 |
| B2O3 | 64.5 |  | 0.016125 |  |  |  |  |  |  |
| 40175 |  |  |  |  |  |  |  |  |  |
| BaO | 23 | 99.95 | 22.9885 | BaO | 22.9885 | BaO |  |  | 33.32451 |
| TiO2 | 52.5 |  | 52.47375 | TiO2 | 52.47375 | TiO2 |  |  | 39.67797 |
| ZrO2 | 7.5 |  | 7.49625 | ZrO2 | 7.49625 | ZrO2 |  |  | 8.732754 |
| SiO2 | 6 |  | 5.997 | SiO2 | 5.997 | SiO2 |  |  | 3.405221 |
| Al2O3 | 9 |  | 8.9955 | Al2O3 | 8.9955 | Al2O3 |  |  | 8.671238 |
| La2O3 | 2 |  | 1.999 | La2O3 | 1.999 | La2O3 |  |  | 6.157671 |
|  |  |  |  |  | 0.03225 | B2O3 |  |  | 0.021228 |
|  |  |  |  |  | 0.01775 | CaO |  |  | 0.009411 |
| CaO | 35.5 | 0.05 | 0.01775 |  |  |  |  |  | 100 |
| B2O3 | 64.5 |  | 0.03225 |  |  |  |  |  |  |
| 40176 |  |  |  |  |  |  |  |  |  |
| BaO | 23 | 99.925 | 22.98275 | BaO | 22.98275 | BaO |  |  | 33.3194 |
| TiO2 | 52.5 |  | 52.46063 | TiO2 | 52.46063 | TiO2 |  |  | 39.67189 |
| ZrO2 | 7.5 |  | 7.494375 | ZrO2 | 7.494375 | ZrO2 |  |  | 8.731415 |
| SiO2 | 6 |  | 5.9955 | SiO2 | 5.9955 | SiO2 |  |  | 3.404699 |
| Al2O3 | 9 |  | 8.99325 | Al2O3 | 8.99325 | Al2O3 |  |  | 8.669909 |
| La2O3 | 2 |  | 1.9985 | La2O3 | 1.9985 | La2O3 |  |  | 6.156727 |
|  |  |  |  |  | 0.048375 | B2O3 |  |  | 0.031845 |
|  |  |  |  |  | 0.026625 | CaO |  |  | 0.014118 |
| CaO | 35.5 | 0.075 | 0.026625 |  |  |  |  |  | 100 |
| B2O3 | 64.5 |  | 0.048375 |  |  |  |  |  |  |

TABLE 4a

| Melt No. | Ceram. No. | Tcryst./ °C. | Freq./ GHz | Q | Qf/ GHz | d/ mm | h/ mm | $\epsilon_r$ | tan δ |
|---|---|---|---|---|---|---|---|---|---|
| (39778 − 99.9875) · ((0.355CaO•0.645B2O3) − 0.075)/mol % |
| 40176 | DEM-70 | 864 | 8.155 | 195 | 1590.22 | 10.28 | 4.97 | 25.8 | 0.005 |
| 40176 | DEM-74 | 950 | 7.831 | 282 | 2208.34 | 10.36 | 5.05 | 27.31 | 0.0034 |
| 40176 | DEM-73 | 975 | 7.016 | 402 | 2820.43 | 10.36 | 5.07 | 33.9 | 0.0024 |
| 40176 | DEM-72 | 1000 | 6.965 | 647 | 4506.355 | 10.37 | 5.07 | 34.37 | 0.0015 |
| 40178 | DEM-60 | 1041 | 7.419 | 1223 | 9073.437 | 10.27 | 4.74 | 33.11 | $6.97*10^{-4}$ |
| (39778 − 99.85) · ((0.355CaO•0.645B2O3) − 0.05)/mol % |
| 40175 | Glass |  | 9.243 | 181 | 1672.983 | 10.36 | 5.03 | 19.66 | 0.0053 |
| 40175 | DEM-61 | 1039 | 7.425 | 1196.62 | 8884.904 | 10.27 | 4.72 | 33.22 | $6.14*10^{-4}$ |
| (39778 − 99.975) · ((0.355CaO•0.645B2O3) − 0.025)/mol % |
| 40174 | DEM-80 | 863 | 8.146 | 205 | 1669.93 | 10.35 | 5.07 | 25.1 | 0.0047 |
| 40174 | DEM-79 | 950 | 7.785 | 292 | 2273.22 | 10.36 | 5.07 | 27.52 | 0.0033 |
| 40174 | DEM-78 | 975 | 7.109 | 418 | 2971.562 | 10.35 | 5.06 | 33.13 | 0.0023 |
| 40174 | DEM-77 | 1000 | 6.984 | 667 | 4658.328 | 10.35 | 5.07 | 34.25 | 0.001 |
| 40174 | DEM-62 | 1041 | 7.408 | 1154.11 | 8549.647 | 10.29 | 4.74 | 33.15 | $7.47*10^{-4}$ |
| (39778 − 99.9875) · ((0.355CaO•0.645B2O3) − 0.0125)/mol % |
| 40173 | Glass |  | 9.218 | 185 | 1705.33 | 10.36 | 5.03 | 19.77 | 0.0052 |
| 40173 | DEM-63 | 1044 | 7.418 | 1192.11 | 8840.888 | 10.3 | 4.73 | 33.14 | $7.15*10^{-4}$ |

Ceramizing time: 6 h

The invention claimed is:

1. A glass-ceramic comprising at least the following constituents (in mol % on oxide basis):

$SiO_2$ 1-<25
$Al_2O_3$ 0-20
$B_2O_3$ 0-<24
$TiO_2$ 10-70
$RE_2O_3$ 0.1-<4.9
BaO 5-35
$SiO_2+Al_2O_3+B_2O_3<25$ wherein RE is selected from the group consisting of a lanthanoid and yttrium, and wherein Ti may be replaced in part by at least one constituent selected from the group consisting of Zr, Hf, Nb, V, and Ta.

2. The glass-ceramic of claim 1, comprising at least the following constituents (in mol % on oxide basis):
$SiO_2$ 2-20
$Al_2O_3$ 0-15
$B_2O_3$ 0-18
$TiO_2$ 25-65
$ZrO_2$ 1-15
$RE_2O_3$ 0.1-<4.9
BaO 10-30
$SiO_2+Al_2O_3+B_2O_3 \leq 20$,
wherein RE is selected from the group consisting of a lanthanoid and yttrium, and wherein Ti may be replaced in part by at least one constituent selected from the group consisting of Zr, Hf, Nb, V, and Ta.

3. The glass-ceramic of claim 2, comprising at least the following constituents (in mol % on oxide basis):
$SiO_2$ 2-20
$Al_2O_3$ 0-15
$B_2O_3$ 0-5
$TiO_2$ 40-65
$ZrO_2$ 5-12
$RE_2O_3$ 0.1-<4.9
BaO 10-30
$10 \leq SiO_2+Al_2O_3+B_2O_3 \leq 20$,
wherein RE is selected from the group consisting of a lanthanoid and yttrium, and wherein Ti may be replaced in part by at least one constituent selected from the group consisting of Zr, Hf, Nb, V, and Ta.

4. The glass-ceramic of claim 1, comprising at least the following constituents (in mol % on oxide basis):
$SiO_2$ 4-8
$Al_2O_3$ 7-11
$B_2O_3$ 0-1
$TiO_2$ 45-55
$ZrO_2$ 5-10
$RE_2O_3$ 0.1-<4.9
BaO 15-30
$10 \leq SiO_2+Al_2O_3+B_2O_3 \leq 20$,
wherein RE is selected from the group consisting of a lanthanoid and yttrium, and wherein Ti may be replaced in part by at least one constituent selected from the group consisting of Zr, Hf, Nb, V, and Ta.

5. The glass-ceramic of claim 1, comprising at least the following constituents (in mol % on oxide basis):
$SiO_2$ 4.5-7
$Al_2O_3$ 8-10
$B_2O_3$ 0-0.5
$TiO_2$ 48-55
$ZrO_2$ 6-9
$RE_2O_3$ 0.1-<4.9
BaO 20-26
wherein RE is selected from the group consisting of a lanthanoid and yttrium, and wherein Ti may be replaced in part by at least one constituent selected from the group consisting of Zr, Hf, Nb, V, and Ta.

6. The glass-ceramic of claim 1, comprising at least 0.005 mol % of a melting additive.

7. The glass-ceramic of claim 6, wherein the melting additive is a low-melting additive of a eutectic composed of glass-forming components.

8. The glass-ceramic of claim 1, comprising 0.01 up to 3 mol % of at least one refining agent selected from the group consisting of $As_2O_3$ and $Sb_2O_3$.

9. The glass-ceramic of claim 1, comprising a dielectric loss (tan δ) of not more than $10^{-2}$ in the high-frequency range at a frequency f>200 MHz.

10. The glass-ceramic of claim 1, having a relative permittivity $\in$ of at least 15.

11. The glass-ceramic of claim 1, having a resonance frequency with a certain temperature dependence, wherein an absolute value of said temperature dependence of said resonance frequency $|\tau_f|$ not more than 200 ppm/K.

12. The glass-ceramic of any of claim 1, comprising at least one solid solution phase based on Ba, Ti, and O, wherein Ba may be replaced at least in part by at least one constituent selected from the group consisting of Sr, Ca, and Mg, and wherein Ti may be replaced at least in part by at least one constituent selected from the group consisting of Zr, Hf, Nb, V, and Ta.

13. The glass-ceramic of claim 12, wherein said least one solid solution phase based on Ba, Ti, and O, further comprises at least one selected from the group consisting of Al, RE, and Si, wherein RE is selected from the group consisting of a lanthanoid and yttrium.

14. The glass-ceramic of claim 1, comprising at least one solid solution phase of the formula $(BaO)_x(RE_2O_3)_y(SiO_2)_z(TiO_2)_u$, wherein RE is selected from the group consisting of a lanthanoid, and yttrium, wherein x, y, and z are all positive integer numbers smaller than five, wherein up to 10% of Ba may be replaced by at least one constituent selected from the group consisting of Sr, Ca, and Mg, and wherein up to 10% of the obligatory fraction of Ti may be replaced by at least one constituent selected from the group consisting of Zr, Hf, Nb, V, and Ta.

15. The glass-ceramic of claim 1, comprising as predominant solid solution phase $BaTi_4O_9$, wherein Ba may be replaced in part by at least one constituent selected from the group consisting of La, Ca, and Sr, and wherein Ti may be replaced in part by at least one constituent selected from the group consisting of Zr, Hf, Y, Nb, V, and Ta.

16. The glass-ceramic of claim 1, comprising as predominant solid solution phase $Ba_4Al_2Ti_{10}O_{27}$, wherein Ba may be replaced in part by at least one constituent selected from the group consisting of La, Ca, and Sr, and wherein Ti may be replaced in part by at least one constituent selected from the group consisting of Zr, Hf, Y, Nb, V, and Ta.

17. The glass-ceramic of claim 1, having an average crystallite size of 10 nanometers to 50 micrometers.

18. A dielectric resonator, electronic frequency filter element, or antenna element for the high-frequency range, having a dielectric comprising a glass-ceramic according to claim 1.

19. A method of producing a dielectric having a dielectric loss of not more than 10-2 in the high-frequency range, comprising the following steps:
melting and homogenizing a starting glass which comprises the following constituents (in mol % on oxide basis):
$SiO_2$ 1-<25
$Al_2O_3$ 0-20
$B_2O_3$ 0-25
$TiO_2$ 10-70
$RE_2O_3$ 0.1-<4.9
BaO 5-35
$SiO_2+Al_2O_3+B_2O_3<25$
wherein RE is selected from the group consisting of a lanthanoid and yttrium, and wherein Ti may be replaced in part by at least one constituent selected from the group consisting of Zr, Hf, Nb, V, and Ta;
pouring the starting glass into a desired shape;
cooling the starting glass to room temperature;
ceramizing the starting glass by a heat treatment.

20. The glass-ceramic of claim 1, wherein the $RE_2O_3$ is present (in mol % on oxide basis) in an amount of 1 to 3.5.

* * * * *